US012262667B2

(12) United States Patent
Kivioja

(10) Patent No.: US 12,262,667 B2
(45) Date of Patent: Apr. 1, 2025

(54) ARRANGEMENT FOR GROWING PLANTS ON MULTILAYER PRINCIPLE

(71) Applicant: NETLED TECHNOLOGY OY, Tampere (FI)

(72) Inventor: Niko-Matti Kivioja, Siivikkala (FI)

(73) Assignee: NETLED TECHNOLOGY OY, Tampere (FI)

( * ) Notice: Subject to any disclaimer, the term of this patent is extended or adjusted under 35 U.S.C. 154(b) by 0 days.

(21) Appl. No.: 18/068,279

(22) Filed: Dec. 19, 2022

(65) Prior Publication Data

US 2023/0128494 A1 Apr. 27, 2023

Related U.S. Application Data

(63) Continuation-in-part of application No. 16/637,196, filed as application No. PCT/FI2018/050528 on Jul. 3, 2018, now Pat. No. 11,559,015.

(30) Foreign Application Priority Data

Aug. 7, 2017 (FI) ...................................... 20175713

(51) Int. Cl.
*A01G 9/029* (2018.01)
*A01G 9/02* (2018.01)

(52) U.S. Cl.
CPC ........... *A01G 9/0299* (2018.02); *A01G 9/023* (2013.01)

(58) Field of Classification Search
CPC ...... A01G 31/042; A01G 9/022; A01G 9/023; A01G 9/027; A01G 9/0299
See application file for complete search history.

(56) References Cited

U.S. PATENT DOCUMENTS

| 3,664,061 A | 5/1972 | Oepen |
| 2004/0163308 A1 | 8/2004 | Uchiyama |

(Continued)

FOREIGN PATENT DOCUMENTS

| AU | 2009225349 B2 | 8/2016 |
| JP | H0847348 A | 2/1996 |

(Continued)

OTHER PUBLICATIONS

International Search Report and Written Opinion in corresponding International Application No. PCT/FI2018/050528 mailed Oct. 10, 2018 (11 pages).

(Continued)

*Primary Examiner* — Joshua J Michener
*Assistant Examiner* — Henry Hooper Mudd
(74) *Attorney, Agent, or Firm* — Jeffri A. Kaminski; Venable LLP

(57) ABSTRACT

A method and a system for growing plants on multilayer principle in mobile gutter farming is described, whereby, in the process of growing plants planted in cultivation gutters, said plants are conveyed in cultivation layers present on top of each other in a cultivation space in a longitudinal direction of the cultivation space in one or opposite directions. The cultivation gutters and the plants contained therein, are treated in the cultivation space by means of a processing arrangement in a cultivation layer-specific manner, whereby the cultivation gutters and the plants contained therein are first of all conveyed by motion elements in each cultivation layer of the cultivation space in the longitudinal direction of the cultivation space in opposite directions and are treated by processing elements in each cultivation layer of the cultivation space separately, in a manner substantially independent of the other cultivation layers.

13 Claims, 4 Drawing Sheets

(56) References Cited

U.S. PATENT DOCUMENTS

Figure 1A:
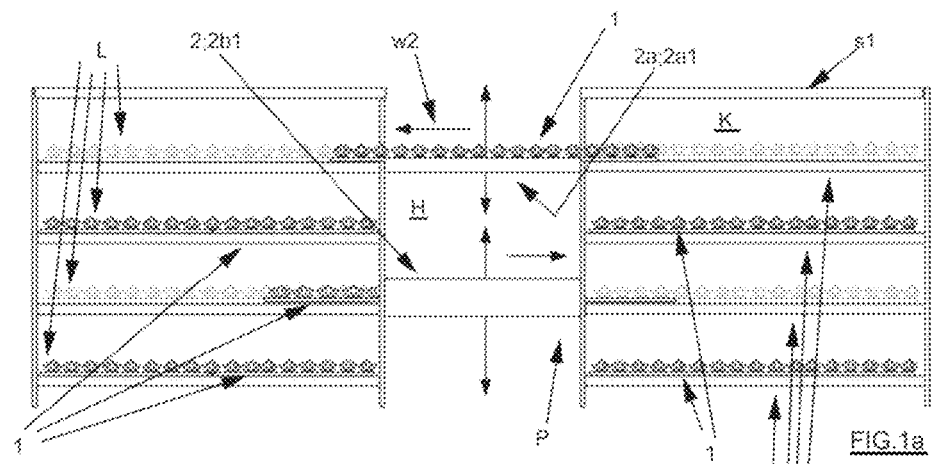

| | | | |
|---|---|---|---|
| 2012/0227322 | A1 | 9/2012 | Belmote et al. |
| 2014/0017043 | A1 | 1/2014 | Hirai et al. |
| 2015/0250115 | A1 | 9/2015 | Pickell et al. |
| 2015/0282437 | A1 | 10/2015 | Ohara et al. |
| 2019/0307077 | A1* | 10/2019 | Lert .......................... A01G 9/14 |
| 2020/0163283 | A1* | 5/2020 | Aminpour ................ A01G 9/02 |
| 2020/0187427 | A1* | 6/2020 | Brault ...................... A01G 9/02 |
| 2020/0367455 | A1* | 11/2020 | Vesty ...................... A01G 31/04 |

FOREIGN PATENT DOCUMENTS

| | | | |
|---|---|---|---|
| JP | H09154414 | A | 6/1997 |
| JP | 2010051256 | A | 3/2010 |
| JP | 2010057448 | A | 3/2010 |
| JP | 2012034686 | A | 2/2012 |
| JP | 2015501157 | A | 1/2015 |
| JP | 2015223082 | A | 12/2015 |
| JP | 2016054683 | A | 4/2016 |
| KR | 20120021543 | A | 3/2012 |
| KR | 101406293 | B1 | 6/2014 |
| WO | 2014057800 | A1 | 4/2014 |
| WO | 2017024353 | A1 | 2/2017 |

OTHER PUBLICATIONS

Extended European Search Report in corresponding European Application No. 18843747.9 dated Apr. 7, 2021 (8 pages).
Japanese Office Action in corresponding Japanese Application No. 2020-507058 dated May 10, 2022 (8 pages).

* cited by examiner

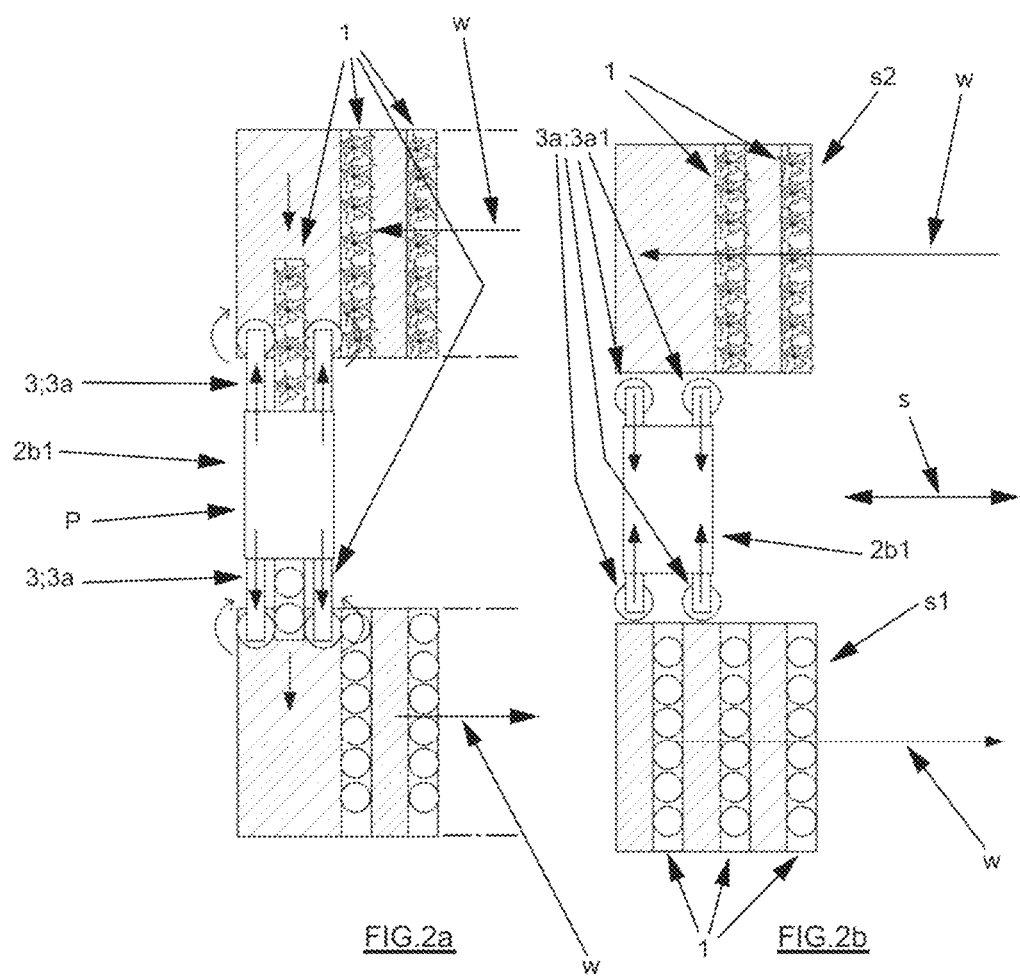

ARRANGEMENT FOR GROWING PLANTS ON MULTILAYER PRINCIPLE

CROSS-REFERENCE TO PRIOR APPLICATIONS

This application is a continuation-in-part of and claims the benefit of U.S. patent application Ser. No. 16/637,196, filed on Feb. 6, 2020, which is a U.S. National Stage application of and claims the benefit of International Patent Application No. PCT/FI2018/050528, filed Jul. 3, 2018, which claims the benefit of Finnish Patent Application No. 20175713, filed Aug. 7, 2017, all of which are incorporated by reference.

The invention relates to an arrangement for growing plants on multilayer principle, according to the preambles of the independent claims directed thereto.

It is particularly an object of the invention to enhance the growing of plants on multilayer principle, whereby plants planted in cultivation gutters are carried by auxiliary power-operated motion elements in the longitudinal direction of a cultivation space in cultivation layers present on top of each other in the cultivation space.

In this regard, the conventional plant growing technique is represented especially by so-called mobile gutter farming, whereby the roots of to-be-cultivated plants are typically contained in a "root ball" composed of peat. Along the bottom of a cultivation gutter used in such farming flows a thin layer of fertilizer solution from which the plant roots obtain necessary nutrients and water. The cultivation gutters are typically made of a white hard plastic and, depending on to-be-cultivated plants, are provided either with an open top surface or just with holes for the plants. This technique is typically used for planting potted lettuces or so-called babyleaf type growth, wherein the plants are planted in the form of a flat carpet across the entire cultivation gutter. The cultivation gutters are further typically closed at one end thereof and open at the other end, the closed end being used for dispensing a fertilizer solution which flows from the cultivation gutters' open end freely into a collection trough. The required flow rate of fertilizer solution is achieved conventionally by constructing the gutter frame so as to decline towards its open end.

Plant cultivation using mobile gutter farming supports farming of different types of plant products. For example, herbs, salads or other plants can be cultivated as potted products, where the plants are cultivated, harvested, packed and sold without removing them from their cultivation substrate. On the other hand, babyleaf products are harvested by cutting the young plants from their base, thus leaving the substrate in the cultivation gutter for disposal. After harvesting, babyleaf products are packed for resale as leaves without the root and the substrate.

In a so-called first generation of multilayer farming conducted by mobile gutter technique, the cultivation gutters are adapted to travel in one layer of the cultivation space automatically from end to end of a cultivation line, yet are raised to and lowered from the cultivation layers manually. In second generation systems, the cultivation gutters are first carried by a lift down from the end of a line system and then further to buffer storage to wait therein for further processing such as, for example, a harvesting cutter. This is followed by passing the same to gutter draining, disinfecting, refilling, sowing and pre-irrigation, after which the gutters proceed to a next buffer storage to wait for their turn on the lift so as to raise them back to cultivation layers.

However, the second-generation systems developed in response to practical needs continue, as presently available, to involve significant drawbacks, one notable example of which is that there is continuously a considerable number of cultivation gutters in buffer storage, waiting either for transfer lifts or a processing stage. In addition, the equipment base involved therein is highly complicated, involving a plethora of moving parts demanding continuous maintenance/upkeep for ensuring reliable operation of the system. Further, particularly because of the buffer storage principle, such systems require the cultivation space to have a very extensive floor surface area. Moreover, the lift assembly removing cultivation gutters from cultivation layers makes a significant bottleneck in the discussed processing, creating downtime e.g. for other process equipment.

The cultivation lines are used for the growth of the plants as seedlings after sowing, and after a transplant of the seedling to grown plants. There are several functions before, after and between different cultivation steps that need to be completed in order to support the growth and correct operation of the cultivation lines. These steps, that are conventionally executed at least partially manually, require precise control and high throughput when mobile gutter farms increase in size and production volume. Manual labor limits both throughput and causes also need for buffer storage for e.g. cultivation gutters waiting for cleaning, sowing or harvesting steps.

It is an objective of the arrangement according to the present invention to provide a decisive improvement regarding the foregoing problems, and to thereby raise substantially the available state of the art. In order to attain this objective, the arrangement of the invention is principally characterized by what is presented in the characterizing clauses of the independent claims directed thereto.

As most important benefits gained by the arrangement of the invention should be mentioned the simplicity and effectiveness of the arrangement solution involved therein and the use thereof, thereby enabling a remarkable improvement in the cost effectiveness of especially mobile gutter farming by virtue of the fact that all expensive technology- and automation-demanding logistic parts and components of the plant growing apparatus are possible to implement with highly compact and easy-to-maintain integrated equipment solution. In the context of the invention, the cultivation gutters are operated in side-by-side cultivation line systems longitudinally of the cultivation space in opposite directions. Hence, the motion elements of a processing arrangement present in the cultivation space include preferably a transfer device, such as conveyed transfer tables, present between oppositely directed cultivation lines of the cultivation space, by which the cultivation gutters are shifted from what in transverse sense is a cultivation line passing in a first direction onto a cultivation line passing in a second direction. It is possible to automate the growing of plants by making use of a processing arrangement, which is present between the oppositely-directed cultivation lines of the cultivation space, and by which the cultivation gutters and the plants contained therein are shifted in lateral direction from a cultivation line extending in a second direction while processing the plants and cultivation gutters, such as harvesting of plants, removing of substrate waste, washing/disinfecting of cultivation gutters, placing of fresh substrate, sowing/planting of plants, pre-irrigation thereof, and/or the like. An essential feature in the invention is that, when a cultivation gutter is shifted by the processing device from an incoming line system onto an outgoing line system, it is processed at the same time, whereafter, having passed through the processing device, it is immediately ready for the next cultivation cycle. Therefore, all the foregoing processing stages for cultivation gutters take place in a single operation without e.g. the maneuvering of cultivation gutters from one processing stage to another.

The invention enables production of various plant species in discrete layers, thereby simplifying such a system considerably and preventing various plants from blending into each other in the production process. However, a system using the arrangement of the invention for its operation need not necessarily include automated processing, enabling the working personnel and the working area to be raised, e.g. with a platform lift, to a convenient height for the processing of each presently treated cultivation layer, whereby just the workers/equipment are moving in vertical direction instead of cultivation gutters/tables.

The processing arrangement presented is located between the cultivation lines for executing the functions needed to treat the plants by the processing device included in it. The functions preferably include at least transfer of the cultivation gutters and plants contained therein to and from the cultivation lines, loading of fresh substrates and removing the substrates after harvesting, sowing the plants, transplanting the seedlings from seedling gutters to cultivation gutters, washing and disinfecting the gutters, harvesting the plants in different ways, packing and transferring the packed plants on e.g. trays for further processing.

The processing arrangement executes the processing functions through an integrated arrangement, where the abovementioned functions are all executed in the same time for the gutters and plants contained therein that are under processing, thus removing the need for buffer storages. It is of paramount importance for continuous, efficient process and minimum buffer storages, that the processing device's elements and units are arranged to allow simultaneous operation for at least one gutter at a time, enabling different functions to be done in the same time for the same gutter or gutters. The processing arrangement comprises a first conveyed transfer table that receives one or more seedling trays, seedling gutters and/or cultivation gutters from the first cultivation line or and transfers the gutter for processing arrangement to execute the processing functions with processing elements. The processing elements comprise elements e.g. for harvesting, substrate removal, washing, disinfecting, transplanting and/or handling the gutters and/or plants contained therein. As a preferred embodiment of the invention, the arrangement is also arranged to include elements to load the substrate into the growing pots, sow the plants and pre-irrigate the same. The gutters are continuously fed into the processing arrangement, enabling simultaneous operation of different processing functions for the gutters. The first end of one or more gutters passes first through the processing steps, followed by the middle part and finally the second end of the gutter. In practice that enables different processing functions for different parts of a single gutter or several gutters simultaneously, such as harvesting of the plants or in the second end while middle part is under washing and/or disinfecting and the first end under seedling transplanting. Furthermore, the processing arrangement comprises a second conveyed transfer table for feeding the processed gutters and plants and/or seedling trays contained therein to a second cultivation line.

Other preferred embodiments for an arrangement of the invention are presented in the dependent claims directed thereto.

Figure 1B:
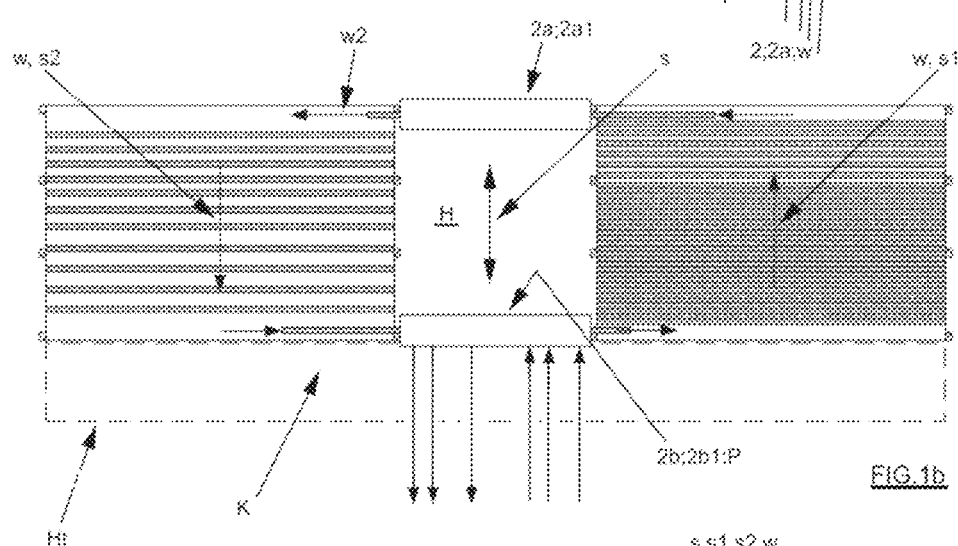
Figure 1C:
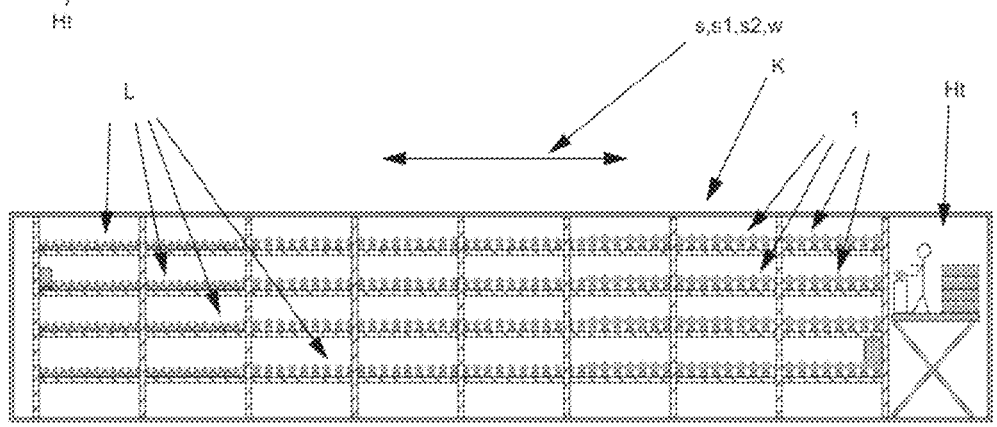
Figure 3:
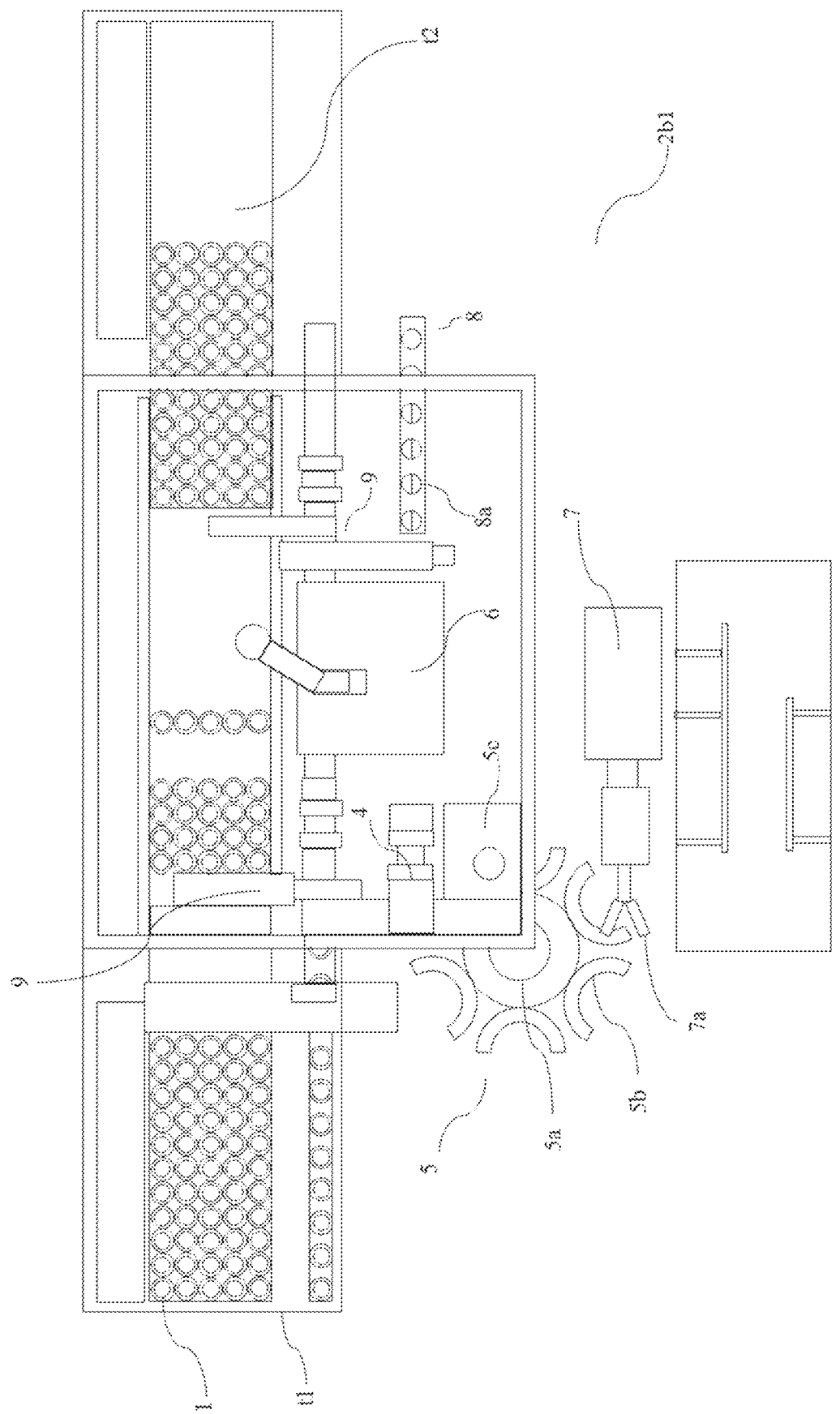
Figure 4:
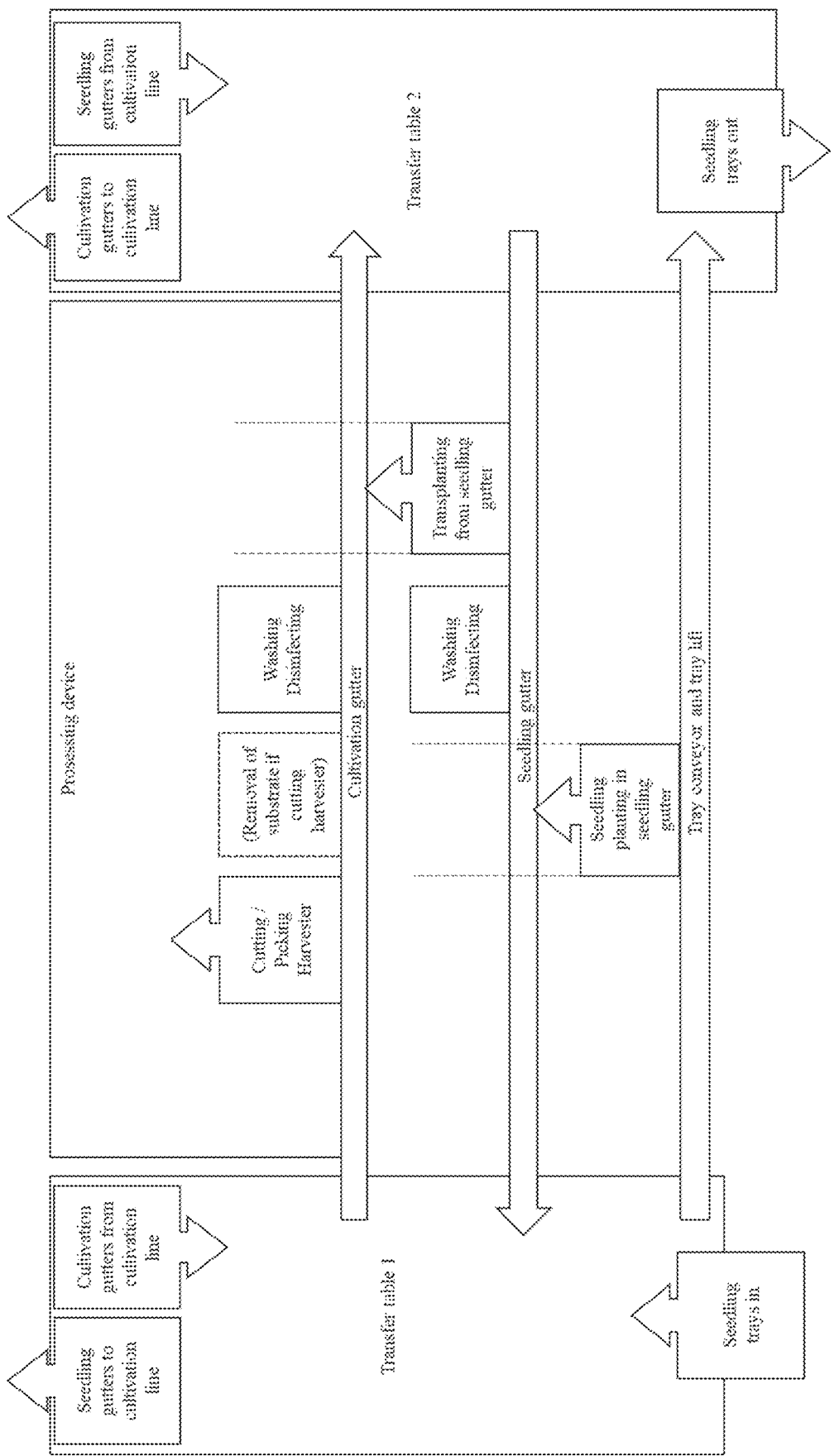

In the subsequent description, the invention will be specified in detail with reference to the accompanying drawings, in which FIGS. 1a-1c show, in an end view, a plan view, and a side view, some exemplary apparatus solutions related to the makeup of an arrangement of the invention, FIGS. 2a and 2b show, in a plan view, exemplary plant engineering related to a lateral shift of cultivation gutters to be performed specifically with the processing arrangement, FIG. 3 shows, in a plan view, an exemplary processing device layout for processing the cultivation gutters, and FIG. 4 shows an exemplary flow of the gutters and plants contained therein in the processing device.

The invention relates first of all to an arrangement for growing plants on multilayer principle in mobile gutter farming, whereby, in the process of growing plants planted in cultivation gutters 1, said plants are conveyed w with auxiliary power-operated motion elements in cultivation layers L present on top of each other in a cultivation space K in a longitudinal direction s of the cultivation space in one or opposite directions. The cultivation gutters 1 used especially in mobile gutter farming, and the plants contained therein, are treated on a principle illustrated in FIGS. 1a-1c in the cultivation space K by means of a processing arrangement 2 in a cultivation layer-specific manner, whereby the cultivation gutters and the plants contained therein are first of all conveyed w, as depicted especially in FIGS. 1a and 1b, by motion elements 2a in each cultivation layer L of the cultivation space K in the longitudinal direction s of the cultivation space in opposite directions and, on the other hand, are treated P by processing elements 2b in each cultivation layer L of the cultivation space separately, in a manner substantially independent of the other cultivation layers.

In a preferred embodiment for an arrangement of the invention, the cultivation gutters are shifted w2 in lateral direction from a cultivation line s1 proceeding in a first direction onto a cultivation line s2 proceeding in a second direction by means of a transfer device 2a1, which is included in the processing arrangement's motion elements 2a and which is present in a gap H between the oppositely directed cultivation lines s1, s2.

In an embodiment of the arrangement further preferred in this context, the cultivation gutters 1, and the plants contained therein, are shifted by a processing device 2b1, which is included in the processing arrangement's processing elements 2b and which is present in the gap H between the cultivation lines s1, s2, in a lateral direction w2 from the cultivation line s2 extending in the second direction for processing P the plants and the cultivation gutters 1, such as for harvesting the plants, removing substrate waste, washing/disinfecting the cultivation gutters, placing fresh substrate, sowing/planting the plants, pre-irrigating the same, and/or the like purpose, and/or for returning the same onto the cultivation line s1 extending in the first direction.

In an embodiment of the arrangement further preferred for the invention, the cultivation gutters 1 in two or more cultivation layers L of the cultivation space K, and the plants contained therein, are treated in a cultivation layer-specific manner with the transfer device 2a1 and the processing device 2b1, which are operated by a lift and which are included in the processing arrangement 2.

In an embodiment of the arrangement further preferred for the invention, the cultivation gutters 1 and the plants contained therein are treated with actuators 3, which are provided in the processing arrangement 2 and are preferably, moreover, automatically controlled, such as, referring particularly to FIGS. 2a and 2b, with gripping elements 3a included in the transfer device 2a1 and in the processing device 2b1 and making it possible to take hold of the cultivation gutters 1 and to shift w2 the same in lateral direction, and/or with e.g. harvesting, scraping, washing/disinfecting, substrate-placing, seed/seedling-planting and/or pre-irrigating elements and/or the like included in the processing device 2b1.

The invention also relates, on the other hand, to a system for applying the above-described arrangement, including, with particular reference to FIGS. 1a and 1b, a processing arrangement 2 for treating cultivation gutters 1 used especially in mobile gutter farming, and plants contained therein, in a cultivation space K in a cultivation layer-specific manner, said processing arrangement including first of all motion elements 2a for conveying w the cultivation gutters and the plants contained therein in each cultivation layer L of the cultivation space K in a longitudinal direction s of the cultivation space in opposite directions, and, on the other hand, processing elements 2b for treating P the same in each cultivation layer L of the cultivation space separately, in a manner substantially independent of the other cultivation layers.

In a preferred embodiment of the invention, the processing arrangement 2 includes the processing device 2b1, further comprising with reference to FIGS. 3 and 4, a first transfer table t1 preferably with one or more conveyors to receive one or more cultivation gutters 1 and plants contained therein from the second cultivation line s2 for shifting the cultivation gutters 1 containing the plants into processing. Said processing device 2b1 preferably includes a harvester 4 to harvest the plants starting from the first end of the gutter 1 containing the plants. As preferred embodiments, the harvester 4 can be of a cutting type, especially in the mode of operation where the plants are harvested without their pot and root-ball, or a picking type to harvest the plants from the gutter as whole plants, including their growth pot and root-ball, by grabbing the plants e.g. from their leaves or growth pot. The harvester 4 comprises preferably a cutting actuator to cut the plant from the base of the plant, leaving the substrate in the gutter, and a picking actuator to hold the plant during harvesting and to transfer the harvested plant into packaging arrangement 5 for packing the plants. The said packaging arrangement comprises a package magazine 5a, equipped with holding elements 5b to hold e.g. a resale package, such as a plastic bag or the like. The processing device 2b1 further preferably comprises a washing unit 6 with optional device for disinfecting the gutters 1.

Further, a second transfer table t2 is included in the processing device 2b1 preferably on the opposite side of the first transfer table t1 to transfer the gutters 1 seedlings and/or plants contained therein to the first cultivation line s1.

As a preferred embodiment of the invention, the processing device 2b1 further comprises a substrate removal unit to remove the growth substrate from the gutter 1 wherein the harvesting the plants has been done using the cutting harvester 4, wherein the said removal unit is arranged to treat the first end of the gutter forwarded for substrate removal operating simultaneously with the harvester 4 treating the next plants in the same gutter 1.

The processing device 2b1 further comprises a substrate loading actuator, a sowing unit and a pre-irrigation unit as preferred embodiments to load the substrate in the gutter, to sow plant seeds and to pre-irrigate the same.

As a preferred embodiment of the invention, the elements of the processing device 2b1 are arranged to be operated by one or more robots or other machine automation devices, such as servo and other types of drives, pneumatic or electric actuators, robots and/or the like.

As a preferred embodiment of the invention and referring to FIG. 3, the processing device 2b1 includes a packaging arrangement 5, further comprising: a funnel 5c, wherein the harvester 4 drops the harvested plants and through which the harvested plants fall into a package, such as a plastic or biodegradable bag; and a package magazine 5a with package holding elements 5b, such as a revolver type bag holder, for holding the package, for example from its top edge, to receive the harvested plants directly in their package.

As a further preferred embodiment of the invention, the processing device 2b1 further includes a package transfer unit 7 to transfer the packaged plants to package trays for further processing, such as packaging for wholesale or resale, or the like. The package transfer unit 7 comprises a robot, such as a six-axis robot, as a preferred embodiment of the invention, and a suitable plant pick-up actuator 7a attached on the robot for picking up the plants from the packaging arrangement 5 and transferring the on trays.

As a preferred embodiment of the invention for processing the plants, the processing device 2b1 further comprises a tray conveyor 8 adapted to receive seedlings on trays and/or seedling gutters and to forward the said trays and/or gutters into the processing device 2b1, and a transplanter 9 for transplanting the seedlings into seedling gutters 8a and further, after cultivation, transplanting the seedlings with the transplanter 9 into the cultivation gutters 1. As an embodiment of the invention, the tray conveyor 8 is equipped with a lifting device for elevating the tray.

As a further preferred embodiment of the invention, the seedlings enter the processing device 2b1 on seedling trays instead of gutters, wherein the processing arrangement 2 and processing device 2b1 are adapted to treat the seedlings on trays before transplanting them into the cultivation gutters 1 and seedling gutters 8a.

With particular reference to FIGS. 3 and 4, the processing device 2b1 further comprises as a preferred embodiment a transplant unit 9 to plant seedlings into a seedling gutter. The first transfer table t1 included in the device 2b1 is used to forward the seedling gutter into the first cultivation line s1. The second transfer table t2 is included in the processing arrangement to receive seedling gutters from the second cultivation line s2 after completing the cultivation cycle and to forward the seedlings into the processing device 2b1. Furthermore, the processing device 2b1 utilizes the transplanter 9 to transplant the seedlings further from the seedling gutter into a cultivation gutter 1, and the second transfer table t2 to forward the gutters 1 and plants contained therein further onto the second cultivation line s2 for cultivating the plants. After transplanting, the washing unit 6 included in the arrangement is being used to wash and optionally disinfect the seedling gutters for planting new seedlings from the seedling tray.

In an embodiment of the system further preferred for the invention, with particular reference to FIGS. 2a and 2b, the motion elements 2a of its processing arrangement include a transfer device 2a1 present in a gap H between oppositely directed cultivation lines s1, s2 for shifting w2 the cultivation gutters in lateral direction from the cultivation line proceeding in a first direction onto the cultivation line proceeding in a second direction.

In an embodiment of the system further preferred for the invention in this context, the processing elements 2b of the processing arrangement 2 include a processing device 2b1 present in the gap H between the oppositely directed cultivation lines s1, s2 of the cultivation space K for shifting w2 the cultivation gutters 1, and plants contained therein, in lateral direction thereon from the cultivation line s2 extending in the second direction for processing P the plants and the cultivation gutters 1 in abovementioned ways, and/or for returning the same onto the cultivation line s1 extending in the first direction.

In an embodiment of the system further preferred for the invention, the processing arrangement 2 includes a transfer device 2a1 and a processing device 2b1, which are operated by a lift and which enable the cultivation gutters 1 present in two or more superimposed cultivation layers L of the cultivation space K, and the plants contained therein, to be treated in a cultivation layer-specific manner.

In an embodiment of the system further preferred for the invention, its processing arrangement 2 includes most preferably automatically controlled actuators 3, which are provided in the processing arrangement 2 for treating the cultivation gutters 1 and the plants contained therein, such as gripping and shifting elements 3a included in the transfer device 2a1 and in the processing device 2b1 and making it possible to take hold of the cultivation gutters 1 and to shift w2 the same in lateral direction.

In particular reference to FIGS. 2a and 2b, the above-described gripping and shifting elements are implemented by way of drive rollers 3a1, which are present in the transfer and processing devices 2a1 and 2b1 and included in laterally movable transfer arms 3a and which, by rotation, carry out a shifting in lateral direction of the cultivation gutter 1 retained therebetween.

In terms of mobile gutter farming, the present invention represents a so-called third generation vertical farming principle, which particularly enables shifting of the cultivation gutters 1 to be minimized as the latter, in a preferred embodiment, are circling continuously e.g. in two side-by-side cultivation lines. Thus, after the sowing, the cultivation lines start moving, e.g. on the principle depicted in FIGS. 1a-1c and 2a, 2b, forward in a cultivation layer L present in the right-hand cultivation line s1, whereby the mutual distance between the cultivation gutters 1 changes according to space required by presently cultivated plants as the gutters travel in a longitudinal direction s. As the cultivation gutter reaches the other end of a cultivation line in question, it will be shifted w2, with reference to FIGS. 2a and 2b, e.g. by means of the transfer device 2a1 with an operating principle as depicted e.g. in FIGS. 2a and 2b into a respective cultivation layer L of the left-hand cultivation line s2, wherein it continues its movement to a harvesting end while the mutual distance between the cultivation gutters 1 continues increasing as required at this time. Upon reaching the harvesting end, the cultivation gutter proceeds through the processing device 2b1, at which point it is possible, in a preferred embodiment, to carry out all the processing procedures while the cultivation gutter 1 shifts from the left-hand cultivation line onto the right-hand cultivation line, which procedures, e.g. in second generation vertical farming solutions, are implemented in a separate space.

From the standpoint of implementing the invention, it is naturally not significant as to how and by what type of cultivation lines are employed for maneuvering the cultivation gutters in a cultivation space.

Another preferred embodiment of the invention is also that the processing device and the transfer device, included in a system applying the invention, are coupled integrally with lift-operated structures, which enables e.g. the use of just one such processing device for the processing of all cultivation layers. On the other hand, it is possible to increase processing speed of the cultivation apparatus by using e.g. two or more processing devices one above the other, whereby bottom layers are processed by the lower device and top layers by the upper device as each device is moving between several cultivation layers without the need for a cultivation layer-specific processing apparatus. Furthermore, as a preferred embodiment of the invention, it is possible to fix the processing device in place in the cultivation space, and bring the gutters and plants into the processing device e.g. by using a gutter lift that is capable of moving the gutters from the cultivation lines and back in a vertical direction.

It is obvious that the invention is not limited to above-described or -explained embodiments, but it can be modified as necessary within the basic concept of the invention. Therefore, it is first of all clear that the system of the invention may include a more or less automatic processing apparatus, enabling its operation, as presented e.g. with a dashed line in FIG. 1b and on a principle as depicted in FIG. 1c, for so-called manual processing, whereby the worker present on a working platform movable vertically in a working space Ht can be elevated e.g. with a platform lift to an ergonomically appropriate height for processing each cultivation layer to be treated. The system of the invention further enables flexible utilization of varying levels of automation, whereby e.g. the lowest level is totally manual. The next level of automation comprises e.g. the utilization of automated harvesting, but the draining, cleaning and refilling, as well as the sowing of cultivation gutters are performed manually. From here forward, the process stages can be automated in a flexible manner all the way to fully automated processing.

In terms of the present invention, it is practically meaningless e.g. which substrate materials, cultivation space structures or other technology related to cultivation of plants, such as packing, weighing or the like equipment for plants, are used in connection therewith, in addition to which it is possible to vary implementations of the invention with per se conventional equipment solutions and automated adjustments regarding e.g. the indoor climate and lighting conditions of a cultivation space, etc.

It is possible that the equipment engineering-related solutions for a transfer device and a processing device operating in accordance with the invention, regarding especially the lift operation thereof, be implemented with largely identical features, whereby the processing device only needs to be supplemented with tools related to processing. The lift frame used for this purpose can be e.g. a so-called modular aperture panel frame with a possibility of modularly attaching thereto each time desired tools, which can be e.g.:

headlettuce harvester: a cutter which cuts the head of large, over 100 g lettuce off at a base and drops it onto a conveyor, babyleaf harvester: a cutter which cuts, either on a scissors principle or with a high-speed rotating blade cutter, lettuce mat off the surface of a gutter and drops it onto a conveyor, substrate extractor: a substrate scraper which scrapes substrate off the cultivation gutter and drops it onto a waste conveyor, pressure washer: a unit which washes the cultivation gutter with high-pressure water, substrate injector: a device which places a fresh substrate in the cultivation gutter, sowing machine: a device which scatters new seeds on the substrate, and pre-irrigation device which performs pre-irrigation of the substrate before the cultivation gutter is conveyed to a forward end of the cultivation line.

The invention claimed is:

1. An arrangement for growing plants on multilayer principle in mobile gutter farming, said system being intended for growing plants planted in cultivation gutters by conveying the same with auxiliary power-operated motion elements in cultivation layers present on top of each other in a cultivation space in a longitudinal direction of the cultivation space in one or opposite directions, wherein the arrangement includes a processing arrangement for harvesting the plants, washing the cultivation gutters used in mobile gutter farming and transplanting plants to cultivation gutters, the processing arrangement comprising a processing device for treating the cultivation gutters and the plants contained therein, wherein the processing device is arranged to execute different treatment steps simultaneously for one or more cultivation gutters, the processing device comprising: a pressure washer for washing the cultivation gutters after harvesting; a transplanter to transplant seedlings and their substrate to one or more cultivation gutters; and first and second transfer tables for transferring the cultivation gutters with or without the plants therein to and from the cultivation lines.

2. An arrangement according to claim 1, wherein the processing device further comprises a harvester for harvesting the plants.

3. The arrangement according to claim 2, wherein the harvester is a cutting harvester for cutting the plants from their base.

4. The arrangement according to claim 2, wherein the harvester is a picking harvester for picking the plants from gutter with the substrate.

5. The arrangement according to claim 1, wherein the processing device further comprises a packaging arrangement, further comprising: a package magazine comprising two or more holding elements for holding the plant package that receive the plants from the harvester; a funnel for guiding the plant to the package; and a package transfer unit for moving the packaged plant onto a tray for further processing.

6. The arrangement according to claim 5, wherein the package transfer unit is a robot.

7. The arrangement according to claim 1, wherein the gutter washing unit further includes a disinfection device.

8. The arrangement according to claim 1, the processing device further comprising: a substrate extractor, a substrate injector, a sowing machine, and/or a pre-irrigation device.

9. The arrangement according to claim 1, wherein the processing device comprises automatically operated machine automation, pneumatic or electric actuators and/or robotic treatment devices for treating the gutters and plants contained therein.

10. The arrangement according to claim 1, wherein the processing device is operated by a lift for vertical movement.

11. The arrangement according to claim 1, wherein the processing device is arranged to handle seedlings on trays for moving the seedling trays to and from the cultivation lines and for transplanting seedlings into the cultivation gutters.

12. The arrangement according to claim 1, wherein the processing device further comprises a tray conveyor for receiving seedlings on trays and forwarding the said trays into the processing device; and a transplanter for transplanting the seedlings into seedling gutters and after cultivation transplanting the seedlings with the transplanter into the cultivation gutters.

13. The arrangement according to claim 12, wherein the tray conveyor further comprises a lifting device to elevate the seedling tray.

* * * * *